Sept. 9, 1952  G. C. FRICKE  2,609,932
FLUID PURIFYING DEVICE
Filed Oct. 5, 1948

INVENTOR.
GUY C. FRICKE
BY M. A. Hobbs
ATTORNEY

Patented Sept. 9, 1952

2,609,932

UNITED STATES PATENT OFFICE 2,609,932

FLUID PURIFYING DEVICE

Guy C. Fricke, Detroit, Mich., assignor to Bendix Aviation Corporation, South Bend, Ind., a corporation of Delaware Application October 5, 1948, Serial No. 52,910

4 Claims. (Cl. 210—140)

1

The present invention relates to a fluid conditioning device, and more particularly to an improved fluid filtering and/or demulsifying element for said device.

In filtering and demulsifying devices having elements composed of fibrous material, such as fiber glass, cotton waste and the like, there is a tendency for the material to gradually settle during the operation of the device, leaving a small space in the element above the fibrous material. In the conventional filtering and demulsifying elements of this type, a portion of the fluid being filtered may be channeled through this space above the fibrous material without at any time passing through the mass of contaminant removing material. It is thus seen that a portion of the fluid may pass on untreated to the engine or other mechanism, carrying with it foreign materials such as abrasive particles, water and the like which may damage moving parts or clog or restrict jets, valves and nozzles. It is, therefore, one of the principal objects of the present invention to provide a filtering or demulsifying element of the fibrous material type wherein the tendency of the material to settle and form channels is minimized or entirely eliminated.

Another object of the invention is to provide an element of the aforesaid type in which the material is uniformly distributed throughout the container for said material and is prevented from settling, shifting or packing appreciably during the operation of the filtering device so that substantially uniform distributon of the fluid flow through the element is obtained during the operation of the device.

A further object of the invention is to provide a combination filtering and demulsifying element so constructed and arranged as to give high efficiency for long periods of operation.

Additional objects and advantages of the present invention will become apparent from the following description with reference to the accompanying drawings, wherein.

2

Figure 1:
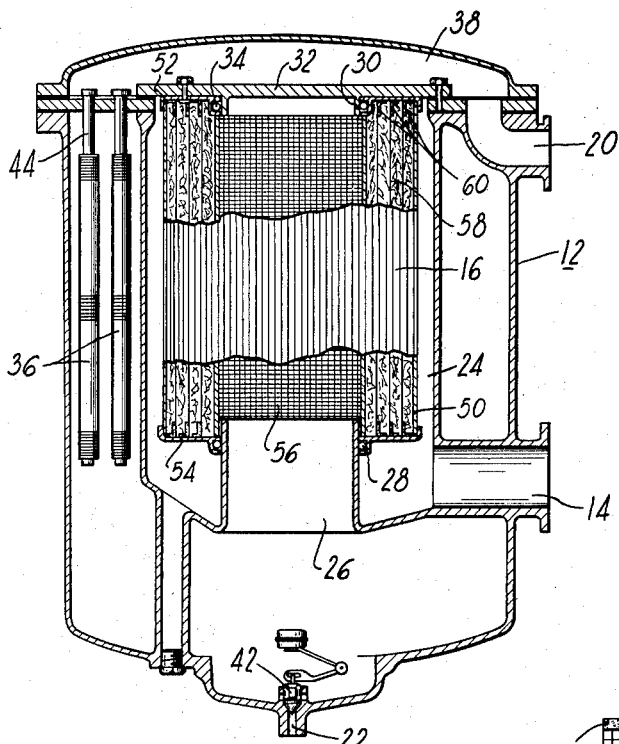
Figure 1 is a vertical cross-sectional view through a filtering and demulsifying device showing the filtering and demulsifying element in partial cross section assembled in operative position in the device.
Figure 4:
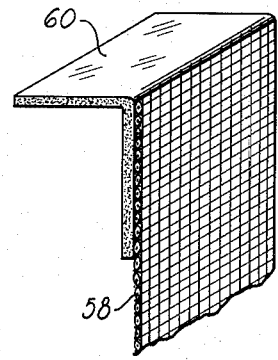
Figure 4 is a fragmentary perspective view of the element shown in Figures 1 and 2.
Figure 2:
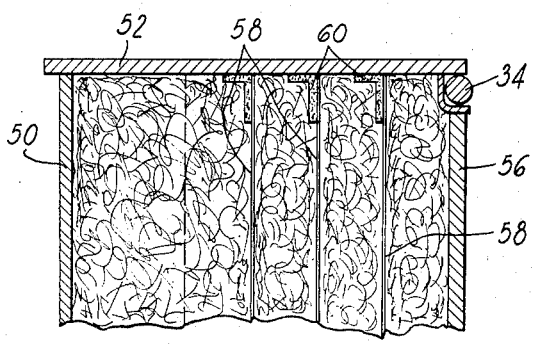
Figure 2 is an enlarged fragmentary cross-sectional view of the filtering and demulsifying element.
Figure 3:
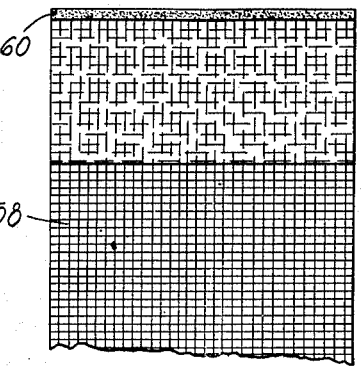
Figure 3 is an enlarged fragmentary plan view of the element shown in Figures 1 and 2.

Referring more specifically to the drawings, in which is shown a fluid filtering and demulsifying device embodying my invention, numeral 12 designates a cylindrical tank-like housing for the filter, 14 an inlet for contaminated fluid such as gasoline containing water and foreign particles, 16 a filtering and demulsifying unit, 20 an outlet for the purified fluid and 22 and outlet for water or other fluid contaminants. Housing 12 contains a centrally located cylindrical chamber 24 for housing the filtering and demulsifying unit 16 which is mounted over a fluid passage 26 connecting chamber 24 with the lower portion of tank 12, and is held in a fluid-tight relationship with the external walls of said passage by a sealing ring 28. The upper end of unit 16 is enclosed in chamber 24 and held in operative position by an annular projection 30 on cover 32 extending into the internal portion of the filter element, said element and annular projection being sealed in fluid-tight relationship by a sealing ring 34 which slips over the outside wall of said projection.

The fluid entering the filtering device first passes through the demulsifying element 16, thence downwardly through passage 26 into the lower portion of the housing 12. The gasoline, for example, containing water in comparatively large droplets formed as the contaminated gasoline passed through the demulsifying element 16, separates from the water and passes upwardly around the outside of chamber 24 through a plurality of edge type filtering elements 36, through chamber 38 and leaves the device in a purified state at outlet 20. The water which is separated from the gasoline in the lower portion of housing 12 collects in a sump at the bottom of the housing and passes from the device through conduit 22 which is controlled by a float actuated valve 42. The edge type filtering elements have a hollow interior closed at the lower end and connected at the upper end, by a hollow supporting stem 44, to the outlet chamber 38. Any other suitable type of filtering element may be used to remove the foreign particles and droplets of water carried by the gasoline from the lower portion of housing 12. The present invention is an improvement in the filtering and demulsifying apparatus disclosed and claimed in application Serial No. 29,978, dated May 29, 1948.

The demulsifying element 16, as shown in the drawings, includes a rather porous pleated paper side wall 50 impregnated with some material, such as a polymerized phenolic resin, to make it resistant to water, gasoline, kerosene and the like, and held rigidly in a cylindrical shape by plates 52 and 54 cemented to each end of the wall 50. A rigid cylindrically-shaped member 56 constructed of a porous material, such as wire screen, is provided in the center portion of the element 16 and is cemented at each end to the end plates 52 and 54. The annular chamber formed between the pleated side wall and the cylindrically-shaped member 56 is filled with a fibrous material such as fibrous glass, excelsior, or cotton waste. In conventionally constructed devices or elements of this type, there is a tendency for this material to settle, leaving a space between the top of the material and the lower side of plate 52, thus making it possible for the fluid being demulsified or filtered to completely by-pass the fibrous material. In the present device, settling of the fibrous material is prevented or minimized by including in the annular chamber a plurality of partitions 58 constructed of a coarsely woven material, such as onionskin cloth or coarse wire screen vertically arranged in spaced relation so that the fibrous material is divided into several distinct sections. These partitions give sufficient support to the fibrous material to prevent it from shifting or packing substantially after it is assembled in the element. The partitions are held in place by angular members 60 of a rather dense material, such as a resin impregnated paper or cloth, cemented or otherwise joined to the upper margin of said partitions and to the top plate of the filtering element. These angular-shaped members extend downwardly into the mass of fibrous material so that, if any settling should take place, the space at the top of the fibrous material resulting therefrom is still entirely above the lower edge of said angular-shaped members; consequently, the fluid in flowing into the space is diverted at each member 60 into the mass of fibrous material and downwardly along the partitions. It is thus seen that angular-shaped members 60 and partitions 58, in addition to giving support to the fibrous material and thus minimizing the tendency of it to form channels through which the fluid can pass, also operate as baffles to direct the fluid through the fibrous mass. By the foregoing arrangement the efficiency of the element is maintained at a high level, and the life of the element is greatly prolonged.

Although only one embodiment of my apparatus has been shown and described herein, it is understood that many modifications may be made to suit requirements. Further modifications of the present invention will occur to those skilled in the art.

I claim:

1. A filter element structure comprising a vertically disposed cylinder, a second vertically disposed cylinder inside of said first mentioned cylinder, an upper and lower plate joined to the top and bottom of said cylinders forming an enclosed annular chamber between said cylinders, fibrous material in said chamber, and a plurality of vertical coarse meshed fabric partitions in said chamber in spaced relation for preventing said material from settling, said partitions extending to the top plate and being secured thereto by an impervious strip extending downwardly from said plate.

2. A filter element structure comprising a vertically disposed cylinder of porous material having longitudinally pleated side walls, a second cylinder of porous material inside said first mentioned cylinder extending coaxially therewith, an upper and lower plate joined to the top and bottom of said cylinders forming an enclosed annular chamber between said cylinders, fibrous material in said chamber, and a plurality of vertical coarse meshed fabric partitions in said chamber in spaced relation for minimizing the tendency of said material to settle, said partitions extending to the top plate and being secured thereto by an impervious strip extending downwardly from said plate.

3. A filtering and demulsifying unit comprising a hollow cylindrical filter element, a cylinder inside said element in spaced relation thereto, an upper and lower plate joined to the top and bottom of said element and cylinder forming an enclosed annular chamber, fibrous material in said chamber, and a plurality of vertical coarse meshed fabric partitions in said chamber in spaced relation for preventing said material from settling, said partitions extending to the top plate and being secured thereto by an impervious strip extending downwardly from said plate.

4. A filtering and demulsifying unit comprising a vertically disposed cylindrical filter element of a treated paper having longitudinally pleated side walls, a cylinder of porous material inside said cylindrical element extending coaxially therewith, an upper and lower plate joined to the top and bottom of said element and cylinder forming an enclosed annular chamber therebetween, glass wool material in said chamber, and a plurality of vertical coarse meshed fabric partitions in said chamber in spaced relation for minimizing the tendency of said material to settle, said partitions being secured to the top plate by an impervious strip extending downwardly from said plate.

GUY C. FRICKE.

REFERENCES CITED

The following references are of record in the file of this patent:

UNITED STATES PATENTS

| Number | Name | Date |
|---|---|---|
| 165,377 | Sinclaire | July 6, 1875 |
| 521,650 | Hafner | June 19, 1894 |
| 575,478 | Haefner | Jan. 19, 1897 |
| 813,327 | Schirmer | Feb. 20, 1906 |
| 1,993,142 | Johnson | Mar. 5, 1935 |
| 2,059,358 | Johnson et al. | Nov. 3, 1936 |
| 2,082,322 | Brundage | June 1, 1937 |
| 2,128,589 | Manning | Aug. 30, 1938 |
| 2,287,344 | Easton | June 23, 1942 |
| 2,333,890 | Russell | Nov. 9, 1943 |
| 2,395,301 | Sloan | Feb. 19, 1946 |
| 2,427,862 | Judkins | Sept. 23, 1947 |

FOREIGN PATENTS

| Number | Country | Date |
|---|---|---|
| 501,176 | Great Britain | Feb. 22, 1939 |
| 322,470 | France | Feb. 5, 1903 |